Feb. 12, 1929.
H. FORD
1,701,843
METHOD OF WELDING WIRE WHEELS
Filed Dec. 31, 1924
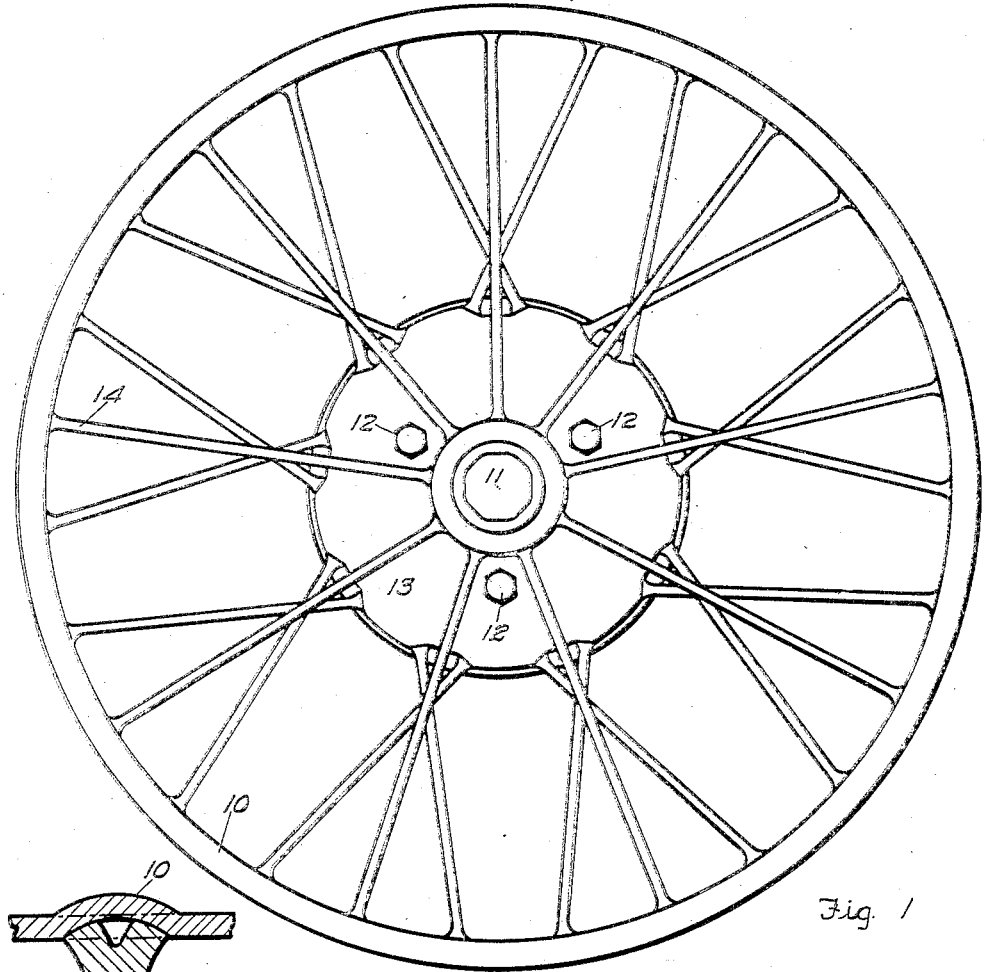
Fig. 1
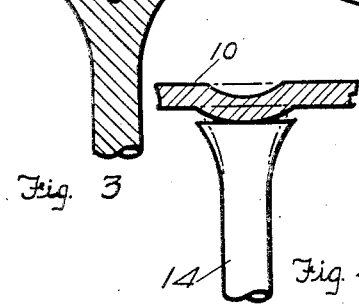
Fig. 3
Fig. 4
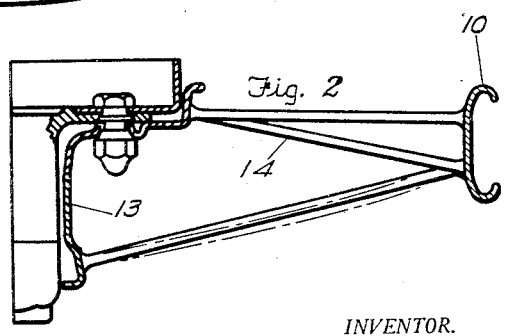
Fig. 2
WITNESS:
INVENTOR.
Henry Ford.
BY
ATTORNEY.

Patented Feb. 12, 1929.

1,701,843

UNITED STATES PATENT OFFICE.

HENRY FORD, OF DEARBORN, MICHIGAN.

METHOD OF WELDING WIRE WHEELS.

Application filed December 31, 1924. Serial No. 759,025.

The object of my invention is to provide new and useful improvements in a wire wheel of simple, durable and inexpensive construction.

A further object of my invention is to provide a novel method for welding the spokes of a wire wheel to the rim or hub thereof.

A further object of my invention is to accomplish the welding of the spokes to the rim or hub by dishing out the hub or rim at the place where the spokes are to be welded and then to flatten out the dished portion by forcing the spokes against it in the presence of a welding current whereby I have been able to secure very efficient joints between the spokes and rim and hub.

With these and other objects in view, my invention consists in the arrangement, combination, and construction of the various parts of my improved device, as described in the specification, claimed in my claims, and shown in the accompanying drawings, in which:

Figure 1 shows a side view of a wheel embodying my invention,

Figure 2 shows a sectional view of a portion of the wheel shown in Figure 1,

Figure 3 shows an enlarged detailed sectional view illustrating one manner of deforming the spokes and rim whereby proper welding joints therebetween may be secured.

Figure 4 shows a somewhat different method of deforming the rim and spokes to secure the same result.

Referring to the accompanying drawings, I have used the reference numeral 10 to indicate a rim for receiving a tire of ordinary construction. A hub 11, designed to be mounted on an axle of a vehicle is provided with attaching bolts 12, whereby the demountable hub 13 may be secured thereon. This hub 13 is connected by a plurality of spokes 14 with the rim 10. I propose to deform the rim and hub at the time these parts are manufactured, this deforming being accomplished in any suitable manner so that there will be a concavity or dished portion of the rim or hub at the place where the spoke will be welded. The ends of the spokes may also be suitably deformed as by upsetting the ends or otherwise shaping them so that the cross-section of the welded joint between the rim and spoke will exceed by a large extent the cross-section of the main portion of the spoke itself. This deforming of the rim or hub is illustrated in two ways in Figures 3 and 4, and also two possible ways of deforming the ends of the spokes are illustrated in those figures.

When the welding is done it will be understood that welding machine jaws are applied respectively to the spoke and rim or hub and the deformed portion of the rim is pressed out flat as illustrated in Figure 2, while the deformed or enlarged end of the spoke is pressed against the deformity in the rim or hub whereby a flow of the adjoining metal portions is secured which makes a very satisfactory joint.

In the making of welded wire wheels, the problem of providing metal to take up the material wasted or used in the welding operation has not heretofore been successfully solved. If a spoke of just the proper length were placed between the hub and rim of a wheel, then there would be no material available to accomplish the weld. The device herein described accomplishes this weld by having a concavity in the rim or hub, forming the spokes initially longer than the normal distance between the hub and rim, allowing the extended ends of the spokes to project into the aforementioned concavity and flattening out the surface of the concavity during the welding operation. It will be understood that the spokes are sprung into place, as is illustrated by the dotted lines in Figure 2.

Many advantages arise from the use of my improved method of securing spokes by welding to rims or hubs and among such advantages it should be pointed out that I have found the spokes are very firmly secured in place. Second, I have found that less current is required for the actual welding operation as the area of contact between the spoke and rim or hub at the time the welding current is applied is relatively small and increases as the parts become heated and are pressed together whereby a maximum heating efficiency of the current is secured.

A third and most important advantage results from my invention in that I am enabled to efficiently weld the spokes in place between the hub and rim as I have solved by this invention the seemingly impossible problem of placing a spoke between the hub and rim which is longer than the distance therebetween, this being necessasry in order to supply the material required for a satisfactory weld.

I claim as my invention:

1. A method of welding a spoke to a corresponding wheel part which consists of deforming the rim or hub to form a concavity, deforming the end of the spoke so that the cross section of the welded joint will be greater than the cross section of the spoke proper and so that the initial contact area of the spoke and the rim or hub will be less than the area of the final weld, and then springing the spoke into contact with the deformed portion of the rim or hub in the presence of a welding current and pressure, so that the contact area of the spoke and rim or hub will increase as the adjacent parts heat and are pressed together thereby progressively flattening out the deformed portions of the spoke and rim or hub.

2. The method of welding a spoke to a corresponding wheel part, which consists in deforming the end of the spoke so that its initial contact area with the rim or hub will be substantially less than the area of the completed weld, the spoke being of greater length than the normal distance between the hub and rim, then bringing the spoke into place between the hub and rim, then applying a welding current and pressure to the contacting portions of the spoke and hub or rim to thereby flatten out the deformed portion of the spoke and form a weld of greater area than the cross section of the spoke.

3. The method of welding a spoke to a corresponding wheel part, which consists in forming the corresponding wheel part with a concavity for each spoke, forming spokes of greater length than the normal distance between the hub and rim, placing the spokes between the hub and rim so that one end of the spokes will fit into the concavities, then applying a welding current and pressure to the contacting portions of the spoke and corresponding wheel parts to thereby flatten out the concavity and form a weld between the spokes and corresponding wheel parts.

4. A method of welding a spoke to a corresponding wheel part which consists in deforming the adjacent spoke end and the rim so that the rim will have a concavity therein and the spoke end a depression therein approximately concentric with the spoke so that the initial contact between the spoke and the rim will be relatively small and then applying a welding current and pressure thereby flattening the said concavity in the rim and causing the contact area between these parts to increase due to the welding action progressing toward the bottom of said depression in the spoke.

HENRY FORD.